United States Patent
Li et al.

(10) Patent No.: US 12,298,881 B2
(45) Date of Patent: May 13, 2025

(54) ANOMALY MONITORING METHOD AND APPARATUS FOR TIMING DATA, ELECTRONIC DEVICE, AND STORAGE MEDIUM

(71) Applicant: JINGDONG CITY (BEIJING) DIGITS TECHNOLOGY CO., LTD., Beijing (CN)

(72) Inventors: Ting Li, Beijing (CN); Junbo Zhang, Beijing (CN); Yanqing Xiao, Beijing (CN); Yu Zheng, Beijing (CN)

(73) Assignee: JINGDONG CITY (BEIJING) DIGITS TECHNOLOGY CO., LTD., Beijing (CN)

( * ) Notice: Subject to any disclaimer, the term of this patent is extended or adjusted under 35 U.S.C. 154(b) by 5 days.

(21) Appl. No.: 18/270,063

(22) PCT Filed: Sep. 17, 2021

(86) PCT No.: PCT/CN2021/119159
§ 371 (c)(1),
(2) Date: Jun. 28, 2023

(87) PCT Pub. No.: WO2022/142494
PCT Pub. Date: Jul. 7, 2022

(65) Prior Publication Data
US 2024/0193068 A1    Jun. 13, 2024

(30) Foreign Application Priority Data

Dec. 30, 2020   (CN) .......................... 202011606882.8

(51) Int. Cl.
*G06F 11/00*    (2006.01)
*G06F 11/34*    (2006.01)

(52) U.S. Cl.
CPC ...... *G06F 11/3452* (2013.01); *G06F 11/3447* (2013.01)

(58) Field of Classification Search
CPC .................. G06F 11/3452; G06F 11/3447
(Continued)

(56) References Cited

U.S. PATENT DOCUMENTS 11,010,260 B1 *   5/2021   Savir .................... G06F 11/3452
11,792,215 B1 *   10/2023   Atay ....................... H04L 67/55
726/23

(Continued)

FOREIGN PATENT DOCUMENTS

CN        108965055 A        12/2018
CN        109000940 A        12/2018

(Continued)

OTHER PUBLICATIONS

Nomoto, Hisamichi, "Notice of Reasons for Refusal for Japanese Application No. 2023-540756", Aug. 6, 2024, JPO, Japan.

(Continued)

*Primary Examiner* — Sarai E Butler
(74) *Attorney, Agent, or Firm* — Bridgeway IP Law Group, PLLC; Jihun Kim

(57) ABSTRACT

An anomaly detection method for time series data includes: obtaining a plurality of pieces of feature information of time series data; generating a target feature combination based on the plurality of pieces of feature information; and performing anomaly result detection based on the target feature combination.

17 Claims, 2 Drawing Sheets

(58) Field of Classification Search
USPC .......................................................... 714/1–57
See application file for complete search history.

(56) References Cited

U.S. PATENT DOCUMENTS

| | | | |
|---|---|---|---|
| 2015/0006972 A1* | 1/2015 | Jones ..................... | G06F 11/076 |
| | | | 714/47.2 |
| 2015/0363250 A1* | 12/2015 | Yabuki ................ | G06F 11/0721 |
| | | | 714/37 |
| 2017/0063909 A1 | 3/2017 | Muddu et al. | |
| 2018/0039555 A1* | 2/2018 | Salunke .............. | G06F 11/3006 |
| 2018/0189128 A1* | 7/2018 | Qiao ....................... | G06N 20/20 |
| 2018/0189242 A1* | 7/2018 | Fukushima ............. | G06F 17/18 |
| 2019/0121715 A1* | 4/2019 | Jameson ............. | G06F 11/3409 |
| 2019/0340392 A1* | 11/2019 | Khorrami ............... | G06F 21/71 |
| 2021/0056430 A1* | 2/2021 | Wu ........................ | G06N 3/006 |

FOREIGN PATENT DOCUMENTS

| | | |
|---|---|---|
| CN | 110598851 A | 12/2019 |
| CN | 111767930 A | 2/2020 |
| CN | 111104736 A | 5/2020 |
| CN | 111860897 A | 10/2020 |
| JP | 2016133895 A | 7/2016 |
| JP | 2020177378 A | 10/2020 |
| JP | 2020201617 A | 12/2020 |
| KR | 20160070327 A | 6/2016 |

OTHER PUBLICATIONS

Feng, Ting, "Office Action for CN Application No. 202011606882.8", Jun. 15, 2024, CNIPA, China.

Venables, W. N. et al., "Modern Applied Statistics with S-PLUS", 3rd ed., 1999, Springer-Verlag, New York.

Fang, Xu et al., "Sewer Pipeline Fault Identification Using Anomaly Detection Algorithms on Video Sequences," in IEEE Access, vol. 8, p. 39574-39586, Feb. 24, 2020.

* cited by examiner

ANOMALY MONITORING METHOD AND APPARATUS FOR TIMING DATA, ELECTRONIC DEVICE, AND STORAGE MEDIUM

CROSS REFERENCE TO RELATED APPLICATIONS

This application a U.S. national phase of International Application No. PCT/CN2021/119159 filed on Sep. 17, 2021, which is claims priority to Chinese patent application No. 202011606882.8, filed on Dec. 30, 2021, the entire contents of which are incorporated herein by reference.

TECHNICAL FIELD

The disclosure relates to the field of data processing technology, in particular to an anomaly detection method for time series data, an electronic device and a storage medium.

BACKGROUND

Currently, anomaly detection for time series data is widely used in production life. For example, detection of customer flow in shopping areas can prevent accidents caused by excessive customer flow, and anomaly detection for information system states.

SUMMARY

Embodiments of the first aspect of the disclosure provide an anomaly detection method for time series data. The method includes:
  obtaining a plurality of pieces of feature information of time series data;
  generating a target feature combination based on the plurality of pieces of feature information; and
  performing anomaly result detection based on the target feature combination.

The embodiments of the second aspect of the disclosure provide an electronic device. The electronic device includes: a memory, a processor and computer programs stored on the memory and executable on the processor, in which when the computer programs are executed by the processor, the anomaly detection method for time series data according to the embodiments of the first aspect of the disclosure is implemented.

The embodiments of the third aspect of the disclosure provide a computer-readable storage medium having computer programs stored thereon. When the computer programs are executed by a processor, the anomaly detection method for time series data according to the embodiments of the first aspect of the disclosure is implemented.

Additional aspects and advantages of the disclosure will be given in part in the following description, become apparent in part from the following description, or be learned from the practice of the disclosure.

BRIEF DESCRIPTION OF THE DRAWINGS

The above and/or additional aspects and advantages of the disclosure will become apparent and easily understood from the following description of embodiments made with reference to the accompanying drawings, in which.

DETAILED DESCRIPTION

Embodiments of the disclosure are described in detail below, and examples of the embodiments are shown in the accompanying drawings, in which the same or similar numbers indicate the same or similar components or components having the same or similar functions throughout the descriptions. The embodiments described below with reference to the accompanying drawings are exemplary, and are intended to be used to explain the disclosure and are not to be construed as limiting the disclosure.

In the related art, the anomaly detection for time series data is often based on the rules given by experts in the field. For example, in accordance with expert experiences and daily detection values, normal intervals for respective technical indicators are specified, and data within a normal interval is considered normal and data beyond the normal interval is considered abnormal. However, this method lacks flexibility and accuracy, and has high cost and low scalability.

In the related art, an automatic machine learning method can also be used to perform the anomaly detection for time series data. However, this method requires label information to establish an evaluation metric of the model's strengths and weaknesses, so as to provide feedback to adjust the model and the parameters. In practice, it is difficult to obtain label data.

To solve the problems in the related art, embodiments of the present disclosure provides an anomaly detection method for time series data, an anomaly detection apparatus for time series data, an electronic device and a storage medium, which are described below with reference to the accompanying drawings.

The anomaly detection method for time series data provided in the embodiment of the disclosure may be performed by an electronic device, which may be a Personal Computer (PC), a tablet computer, or a server, which is not limited herein.

In an embodiment of the disclosure, the electronic device may be provided with a processing component, a storage component and a driver component. Optionally, the driver component and the processing component may be integrally set, and the storage component may store an operating system, an application (APP) or other program modules. The processing component implements the anomaly detection method for time series data provided in the embodiment of the disclosure by executing the APP stored on the storage component.

Figure 1:
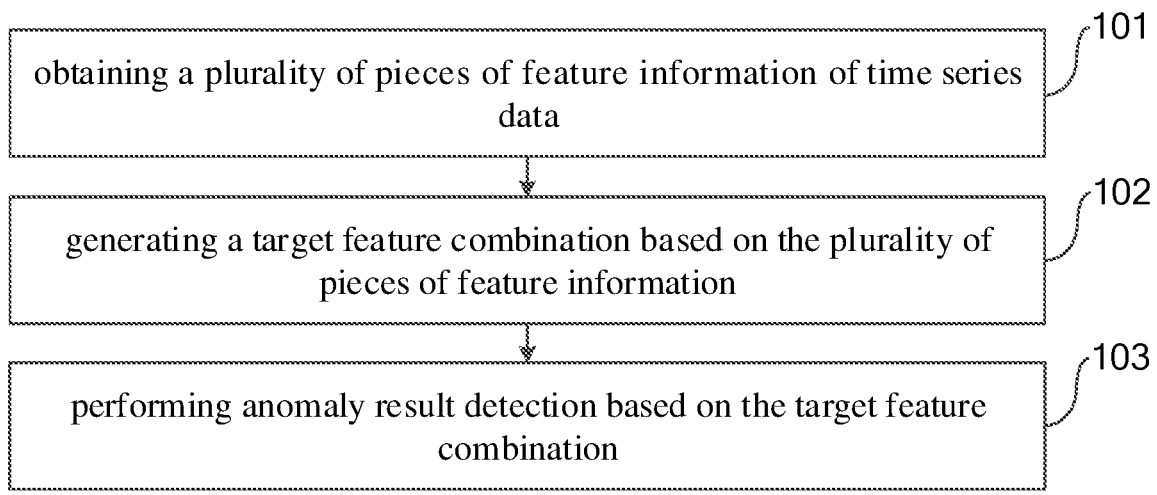
FIG. 1 is a flowchart of an anomaly detection method for time series data according to an embodiment of the disclosure.

FIG. 1 is a flowchart of an anomaly detection method for time series data according to an embodiment of the disclosure.

The anomaly detection method for time series data of the embodiment of the disclosure can be executed by an anomaly detection apparatus for time series data of the embodiment of the disclosure. The apparatus can be configured in an electronic device, to obtain a plurality of pieces of feature information of time series data, generate a target feature combination based on the plurality of pieces of feature information, and perform anomaly result detection based on the target feature combination, so there is no need to set fixed threshold values and acquire label data, with low cost and high scalability.

In a possible implementation, the anomaly detection method for time series data of the embodiment of the disclosure may be executed on a server. The server may be a cloud server, which can be used to perform the anomaly detection method for time series data on the cloud.

As shown in FIG. 1, the anomaly detection method for time series data includes the following steps.

At step 101, a plurality of pieces of feature information of time series data are obtained. The plurality of pieces of feature information include: a plurality of features from a proximity deviation feature, a periodic deviation feature, a trend deviation feature and a residual feature of the time series data.

It should be noted that the time series data described in this embodiment may be sales record data of a shopping platform, for example, the sales record data of the shopping platform within a period of time (e.g., one day, one week, or one month), page view record data of the shopping platform, or people traffic record data of a shopping area, which is not limited herein. The shopping platform may include shopping websites, shopping APPs and shopping systems.

At step 102, a target feature combination is generated based on the plurality of pieces of feature information.

In an embodiment of the disclosure, the electronic device may generate the target feature combination based on the plurality of pieces of feature information using a feature combination generation model or a preset algorithm.

It is noted that the feature combination generation model described in this embodiment may be trained in advance and pre-stored in a storage space of the electronic device for easy access and use. The storage space is not limited to an entity-based storage space, e.g., a hard disk, and the storage space may also be a storage space (i.e., cloud storage space) of a network hard disk connected to the electronic device. The preset algorithm described in this embodiment can be calibrated according to the actual situation.

At step 103, anomaly result detection is performed based on the target feature combination.

In detail, the electronic device may obtain the time series data from the shopping platform, and analyze and calculate the time series data to generate the plurality of pieces of feature information of the time series data, and then the target feature combination is generated according to the preset algorithm and the plurality of pieces of feature information, and finally the anomaly result detection is performed based on the target feature combination.

It should be noted that, generally, relatively recent data and data with a relatively large amplitude of periodic change in the time series data are likely to be abnormal. According to the anomaly detection method for time series data of the embodiment of the disclosure, the relatively recent data and the amplitude of the periodic change in the time series data can be monitored in real time.

In the embodiment of the disclosure, the plurality of pieces of feature information of the time series data are obtained firstly, and the target feature combination is generated based on the plurality of pieces of feature information, and then the anomaly result detection is performed based on the target feature combination. Therefore, by using the target feature combination to perform the anomaly result detection, there is no need to set fixed threshold values and acquire label data, with low cost and high scalability.

To clearly illustrate the previous embodiment, in an embodiment of the disclosure, obtaining the plurality of pieces of feature information of the time series data may include: obtaining a plurality of features from a proximity deviation feature, a periodic deviation feature, a trend deviation feature, and a residual feature of the time series data.

In an embodiment of the disclosure, the following equations (1), (2), (3) and (4) can be used to calculate the proximity deviation, the periodic deviation, the trend deviation and the residual value of the time series data, respectively:

$$L = X_t - X_{t-1} \tag{1}$$

$$Z = X_t - X_{t-1*period} \tag{2}$$

$$Q = X_t - X_{t-1*trend} \tag{3}$$

$$C = (X_t - \hat{X})/\sigma \tag{4}$$

Where, L may be the proximity deviation value, Z may be the periodic deviation value, Q may be the trend deviation value, C may be the residual value, $X_t$ may be time series data at the current moment (i.e., a time series value, e.g., a sales volume of the shopping platform at the current moment), $X_{t-1}$ may be time series data at the previous moment, period may be a periodic deviation interval (e.g., a week), trend may be a trend deviation interval (e.g., 1 month, 2 months, or 15 days), $\hat{X}$ may be a historical average value of the time series data, and $\sigma$ may be a variance of the time series data.

In detail, after obtaining the time series data, the electronic device can calculate the proximity deviation value, the periodic deviation value, the trend deviation value and the residual value of the time series data according to equations (1), (2), (3) and (4) above, and then generate the proximity deviation feature, the periodic deviation feature, the trend deviation feature and the residual feature of the time series data based on the proximity deviation value, the periodic deviation value, the trend deviation value, and the residual value of the time series data, and the preset feature generation algorithm respectively. The preset feature generation algorithm can be calibrated according to the actual situation.

It should be noted that the larger the residual value described in the embodiment, the larger a degree of deviating from an average value at the current moment, i.e., the more likely it is to be abnormal. A classical statistics-based anomaly detection method for time series data considers deviating from the average value greater than 3 times of the variance to be abnormal, i.e., the residual value is a feature for determining abnormal time series.

In addition, there are different types of anomalies, such as anomalies of excessively-large type, and anomalies of excessively-small type. For anomalies of excessively-large type, a method of calculating the proximity deviation value can be as: max $(X_t - X_{t-1}, 0)$, and other kinds of deviation indicators (e.g., the periodic deviation value, the trend deviation value, and the residual value) are calculated in the same way. For anomalies of excessively-small type, a method of calculating the proximity deviation value can be as: min $(X_t - X_{t-1}, 0)$.

In an embodiment of the disclosure, generating the target feature combination based on the plurality of pieces of feature information may include: generating a plurality of feature combinations based on the plurality of pieces of feature information; and selecting the target feature combination from the plurality of feature combinations.

In detail, after obtaining the plurality of pieces of feature information of the time series data, the electronic device may perform feature combination and dimensionality reduction on the proximity deviation feature, the periodic deviation feature, the trend deviation feature, and the residual feature of the time series data in the plurality of pieces of feature information, and perform reorganization according to a feature evaluation effect to obtain the plurality of feature combinations. The electronic device can select an optimal feature combination (which has the best evaluation effect) from the plurality of feature combinations as the target feature combination based on the feature evaluation effect.

It should be noted that the dimensionality reduction described in this embodiment is equivalent to performing a relevant feature merging and de-noising on the features.

To clarify the previous embodiment, in an embodiment of the disclosure, selecting the target feature combination from the plurality of feature combinations may include: calculating a correlation coefficient between multiple features in each of the plurality of feature combinations; and selecting the target feature combination from the plurality of feature combinations based on the correlation coefficient.

It should be noted that the larger the correlation coefficient between the features, the more homogeneous the features are, and the worse the quality of the features. Correlation is generally measured by Pearson's correlation coefficient, and Pearson's correlation coefficient can be equivalent to a cosine similarity.

In an embodiment of the disclosure, the correlation coefficient between the features in each of the feature combinations can be calculated by the following equation (5):

$$p_{x^1,x^2} = \frac{\sum_{i=1}^{n}(x_i^1 - \bar{x}^1)(x_i^2 - \bar{x}^2)}{\sqrt{\sum_{i=1}^{n}(x_i^1 - \bar{x}^1)^2}\sqrt{\sum_{i=1}^{n}(x_i^2 - \bar{x}^2)^2}} \quad (5)$$

Where, $p_{x^1,x^2}$ can be the correlation coefficient, n can be the total time in the time series data, i can be the current time, $x^1$ and $x^2$ can be two features (i.e., two features in the above feature combination), and $\bar{x}^1$ and $\bar{x}^2$ can be average values of the two features respectively, which equivalent to the data obtained by averaging $x^1$ and $x^2$ respectively.

In detail, after the electronic device generates the plurality of feature combinations based on the plurality of pieces of feature information, the correlation coefficient between the multiple features in each of the feature combinations can be calculated separately according to the above equation (5). The correlation coefficients corresponding to the respective feature combinations can be compared to determine the minimum correlation coefficient, and the feature combination corresponding to this correlation coefficient is determined as the target feature combination, i.e., the feature combination with the minimum correlation coefficient is selected from the feature combinations as the target feature combination.

In an embodiment of the disclosure, the anomaly detection method for time series data may also include: calculating a minimum variance between the features in each of the plurality of feature combinations, in which the target feature combination is selected from the plurality of feature combinations based on the correlation coefficient and the minimum variance.

In an embodiment of the disclosure, the minimum variance between the features in each of the plurality of feature combinations may be calculated by the following equation (6):

$$G = \min(\sigma_{x^1}, \sigma_{x^2}), \sigma_{x^1} = \sqrt{\sum_{i=1}^{n}(x_i^1 - \bar{x}^1)^2}, \sigma_{x^2} = \sqrt{\sum_{i=1}^{n}(x_i^2 - \bar{x}^2)^2} \quad (6)$$

Where, G may be the minimum variance between the features, $x^1$ and $x^2$ are two features (i.e., two features of the above feature combination), $\bar{x}^1$ and $\bar{x}^2$ are the average values of the two features respectively, n is the total time in the time series data, and i is the current time.

In detail, after the electronic device calculates the correlation coefficient between the features in each of the feature combinations, the minimum variance between the features in each of the feature combinations can be calculated separately according to equation (6) above, and the minimum variances corresponding to the respective feature combinations can be compared with each other to generate a first comparison result. The electronic device can also calculate the correlation coefficient between the features in each of the feature combinations separately by using equation (5) above, and can compare the correlation coefficients corresponding to the respective feature combinations, to generate a second comparison result. The electronic device may select the target feature combination from the plurality of feature combinations based on the first comparison result and the second comparison result. For example, a feature combination corresponding to the minimum correlation coefficient and the minimum variance is selected as the target feature combination. The selected target feature combination can be made more suitable for the current time series data.

Figure 2:
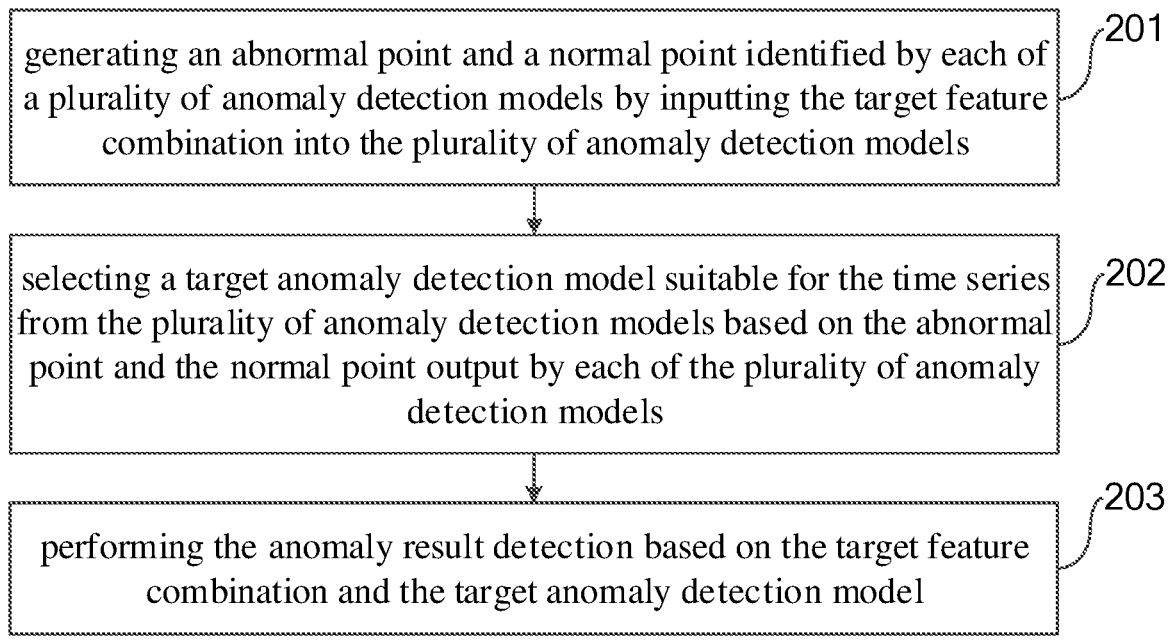
FIG. 2 is a flowchart of an anomaly detection method for time series data according to another embodiment of the disclosure.

In an embodiment of the disclosure, as shown in FIG. 2, performing the anomaly result detection based on the target feature combination may include the following steps.

At step 201, an abnormal point and a normal point identified by each of a plurality of anomaly detection models are generated by inputting the target feature combination into the plurality of anomaly detection models. There may be multiple abnormal points and multiple normal points, and the multiple anomaly detection models can include: a KNN (k-NearestNeighbor) model, a one-class SVM (One-Class Support Vector Machine) model, and an Isolation Forest model.

It is noted that the plurality of anomaly detection models described in this embodiment may be trained in advance and pre-stored in the storage space of the electronic device for easy access and use.

The training and generation of the plurality of anomaly detection models described above may be performed by a relevant server. The server may be a cloud server or a computer host. There may be a communication connection established between the server and the electronic device that can perform the anomaly detection method for time series data provided in the embodiment of the disclosure, and the communication connection can be at least one of a wireless network connection or a wired network connection. The server may send the trained multiple anomaly detection models to the electronic device, so that the electronic device can call when needed, thereby greatly reducing the computation pressure on the electronic device.

In detail, after obtaining the target feature combination, the electronic device may input the target feature combination into the plurality of anomaly detection models separately, so that the target feature combination is processed separately by the plurality of anomaly detection models, to cause each anomaly detection model to output the abnormal point and the normal point, i.e., the abnormal point and the normal point identified by each anomaly detection model.

At step 202, a target anomaly detection model suitable for the time series is selected from the plurality of anomaly detection models based on the abnormal point and the normal point output by each of the plurality of anomaly detection models.

In an embodiment of the disclosure, selecting the target anomaly detection model suitable for the time series from the plurality of anomaly detection models based on the abnormal point and the normal point output by each of the plurality of anomaly detection models may include: obtaining a distance between the abnormal point and the normal point; and selecting the target anomaly detection model suitable for the time series from the plurality of anomaly detection models based on the distance between the abnormal point and the normal point. It should be noted that the distance described in this embodiment may be the minimum distance between the abnormal point and the normal point.

In an embodiment of the disclosure, the distance between the abnormal point and the normal point can be calculated by the following equation (7):

$$V = \min_{x_i \in O} \left( \min_{x_j \in \mathcal{J}} d(x_i, x_j) \right) \tag{7}$$

Where, V can be the distance between the abnormal point and the normal point, $O$ can be a set of all abnormal points output by the anomaly detection model, $\mathcal{J}$ can be a set of all normal points output by the anomaly detection model, $x_i$ can be the abnormal point, and $x_j$ can be the normal point.

It should be noted that, in the disclosure, the performance of each detection model may be measured by the minimum distance between the abnormal point and the normal point output by each anomaly detection model. The minimum distance may refer to a minimum value of the distance between the abnormal point and the normal point. Generally, the longer the minimum distance, the more obvious the anomaly identification effect is, i.e., the better the performance of the model is.

At step 203, the anomaly result detection is performed based on the target feature combination and the target anomaly detection model.

In detail, after the electronic device obtains the abnormal point and the normal point identified by each anomaly detection model, the minimum distance between the abnormal point and the normal point output by each anomaly detection model can be calculated separately by the above-mentioned equation (7). The minimum distances corresponding to the respective anomaly detection models can be compared with each other, to determine a largest one from the minimum distances, and the anomaly detection model corresponding to this largest minimum distance is used as the target anomaly detection model. The electronic device performs the anomaly result detection based on the target feature combination and the target anomaly detection model.

In order to improve the accuracy of selecting the target anomaly detection model suitable for time series, in an embodiment of the disclosure, there may be a plurality of abnormal points, and the method may further include: obtaining an average distance of distances between each of the plurality of abnormal points and the normal point, in which the target anomaly detection model suitable for the time series is selected from the plurality of anomaly detection models based on the distance between the abnormal point and the normal point and the average distance. It should be noted that the average distance described in this embodiment may be the average of minimum distances between each of the plurality of abnormal points and the normal point.

In an embodiment of the disclosure, the average distance between the plurality of abnormal points and the normal point may be calculated according to equation (8):

$$W = \frac{1}{|O|} \sum_{x_i \in O} \min_{x_j \in \mathcal{J}} d(x_i, x_j) \tag{8}$$

Where, W can be the average distance between the plurality of abnormal points and the normal point, $O$ can be the set of all abnormal points output by the anomaly detection model, $\mathcal{J}$ can be the set of all normal points output by the anomaly detection model, $|O|$ can be the number of abnormal points, $x_i$ can be the abnormal point, and $x_j$ can be the normal point.

It is noted that, in the disclosure, the performance of each anomaly detection model may be measured by the average minimum distance between each of the abnormal points and the normal point output by each anomaly detection model. The average minimum distance may refer to an average of the minimum distances between each of the abnormal points and the normal point. Generally, the larger the average minimum distance, the better the performance of the model is.

In detail, after obtaining the abnormal points and the normal point identified by each anomaly detection model, the electronic device may also calculate the average value of the minimum distances between the plurality of abnormal points and the normal point output by each anomaly detection model separately by equation (8) above, and the average values corresponding to respective anomaly detection models may be compared with each other to generate a third comparison result. The electronic device can also calculate the minimum distance between the plurality of abnormal points and the normal point output by each anomaly detection model separately by equation (7) above, and can compare the minimum distances corresponding to the respective anomaly detection models with each other to generate a fourth comparison result. The electronic device may select the target anomaly detection model suitable for the time series from the plurality of anomaly detection models based on the third comparison result and the fourth comparison result. For example, an anomaly detection model corresponding to the largest minimum distance and the largest average distance is selected as the target anomaly detection model. Therefore, the selected target anomaly detection model can be made more suitable for the current time series data.

In conclusion, the anomaly detection method for time series data according to the embodiment of the disclosure, the plurality of pieces of feature information of time series data are obtained, the target feature combination is generated based on the plurality of pieces of feature information, and the anomaly result detection is performed based on the target feature combination. Therefore, the anomaly result detection is performed using the target feature combination without requiring for setting fixed threshold values and acquiring label data, with low cost and high scalability.

Figure 3:
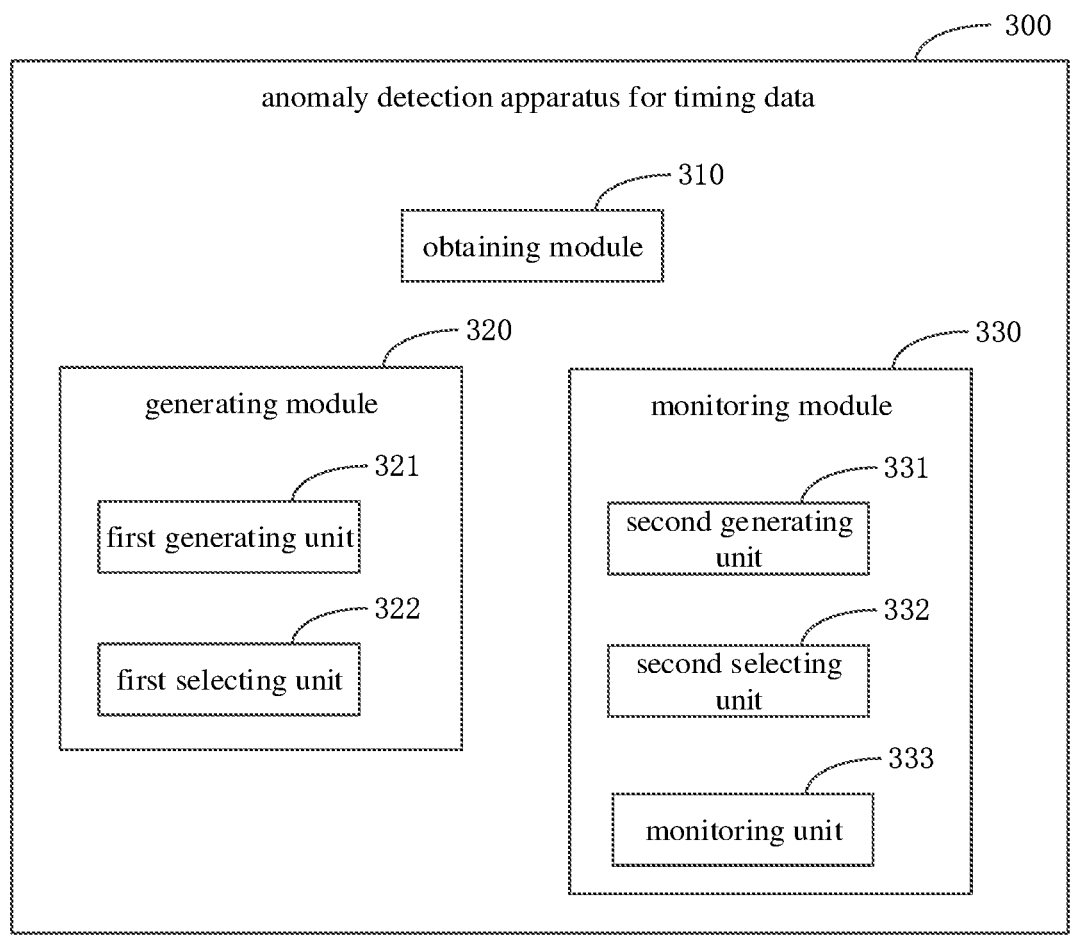
FIG. 3 is a block diagram of an anomaly detection apparatus for time series data according to an embodiment of the disclosure.

FIG. 3 is a block diagram of an anomaly detection apparatus for time series data according to an embodiment of the disclosure.

The apparatus can be configured in an electronic device, to obtain a plurality of pieces of feature information of time series data, generate a target feature combination based on the plurality of pieces of feature information, and perform anomaly result detection based on the target feature combination, so there is no need to set fixed threshold values and acquire label data, with low cost and high scalability.

As shown in FIG. 3, the anomaly detection apparatus 300 for time series data includes: an obtaining module 310, a generating module 320, and a detection module 330.

The obtaining module 310 is configured to obtain a plurality of pieces of feature information of time series data.

The generating module 320 is configured to generate a target feature combination based on the plurality of pieces of feature information.

The detection module 330 is configured to perform anomaly result detection based on the target feature combination.

In an embodiment of the disclosure, the obtaining module 310 is further configured to: obtain a plurality of features from a proximity deviation feature, a periodic deviation feature, a trend deviation feature and a residual feature of the time series data.

In an embodiment of the disclosure, as shown in FIG. 3, the generating module 320 includes: a first generating unit 321 and a first selecting unit 322.

The first generating unit 321 is configured to generate a plurality of feature combinations based on the plurality of pieces of feature information.

The first selecting unit 322 is configured to select the target feature combination from the plurality of feature combinations.

In an embodiment of the disclosure, the first selecting unit 322 is configured to: calculate a correlation coefficient between features in each of the plurality of feature combinations; and select the target feature combination from the plurality of feature combinations based on the correlation coefficient.

In an embodiment of the disclosure, the first selecting unit 322 is further configured to: calculate a minimum variance between the features in each of the plurality of feature combinations, in which the target feature combination is selected from the plurality of feature combinations based on the correlation coefficient and the minimum variance.

In an embodiment of the disclosure, as shown in FIG. 3, the detection module 330 includes: a second generating unit 331, a second selecting unit 332, and a detection unit 333.

The second generating unit 331 is configured to generate an abnormal point and a normal point identified by each of a plurality of anomaly detection models by inputting the target feature combination into the plurality of anomaly detection models.

The second selecting unit 332 is configured to select a target anomaly detection model suitable for the time series from the plurality of anomaly detection models based on the abnormal point and the normal point output by each of the plurality of anomaly detection models.

The detection unit 333 is configured to perform the anomaly result detection based on the target feature combination and the target anomaly detection model.

In an embodiment of the disclosure, the second selecting unit 332 is configured to: obtain a distance between the abnormal point and the normal point; and select the target anomaly detection model suitable for the time series from the plurality of anomaly detection models based on the distance between the abnormal point and the normal point.

In an embodiment of the disclosure, there are a plurality of abnormal points, the second selecting unit 332 is further configured to: obtain an average distance between the plurality of abnormal points and the normal point, in which the target anomaly detection model suitable for the time series is selected from the plurality of anomaly detection models based on the distance between the abnormal point and the normal point and the average distance.

It is noted that the details not disclosed in the anomaly detection apparatus for time series data of the embodiment of the disclosure can be referred to the details disclosed in the anomaly detection method for time series data of the embodiment of the disclosure, which will not be repeated here.

In conclusion, with the anomaly detection apparatus for time series data of the embodiment of the disclosure, the obtaining module obtains the plurality of pieces of feature information of time series data, the generating module generates the target feature combination based on the plurality of pieces of feature information, and the detection module performs the anomaly result detection based on the target feature combination. Therefore, the anomaly result detection is performed using the target feature combination, so there is no need to set fixed threshold values and acquire label data, which is low cost and highly scalable.

Figure 4:
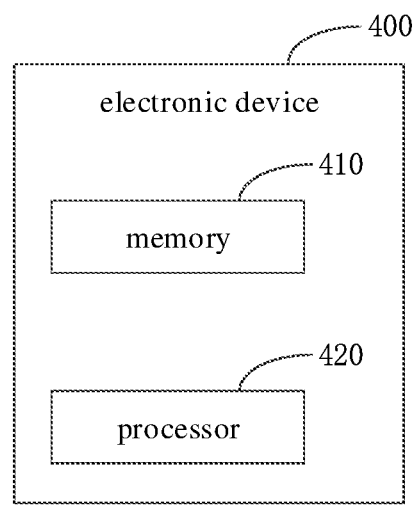
FIG. 4 is a schematic diagram of an electronic device according to an embodiment of the disclosure.

To achieve the above embodiments, as shown in FIG. 4, the disclosure also proposes an electronic device 400, including a memory 410, a processor 420 and computer programs stored on the memory 410 and executable on the processor 420. The processor 420 executes the programs to implement the anomaly detection method for time series data proposed in the preceding embodiment of the disclosure.

The electronic device of the disclosure performs the anomaly result detection using the target feature combination by executing the computer programs stored on the memory through the processor, so there is no need to set fixed threshold values and acquire label data, with low cost and high scalability.

In order to achieve the above embodiments, the disclosure also proposes a non-transitory computer readable storage medium on which computer programs are stored. The computer programs are executed by a processor to implement the anomaly detection method for time series data proposed in the previous embodiment of the disclosure.

With the computer-readable storage medium of the embodiments of the disclosure, by storing the computer programs and executing the computer programs through the processor, the anomaly result detection is performed using the target feature combination, so there is no need to set fixed threshold values and acquire label data, with low cost and high scalability.

In the description of this disclosure, the terms "first" and "second" are used for descriptive purposes only, and are not construed as indicating or implying relative importance or implicitly indicating the number of technical features indicated. Therefore, the features including the terms "first" and "second" may explicitly or implicitly indicate at least one such feature. In the description of this disclosure, "a plurality of" means at least two, e.g., two or three, unless specified otherwise expressly and specifically limited.

In the description of the disclosure, the reference terms "an embodiment", "some embodiments", "an example", "a specific example", and "some examples" and the like means that a particular feature, structure, material, or characteristic described in combination with the embodiment or example is included in at least one embodiment or example of the disclosure. In this description, the schematic expressions of the above terms do not have to be directed to the same embodiments or examples. Moreover, the particular feature, structure, material, or characteristic described may be combined in a suitable manner in any one or more embodiments or examples. In addition, without contradicting each other, those skilled in the art may combine different embodiments or examples described in this disclosure and features of different embodiments or examples.

Although the embodiments of the disclosure have been shown and described above, it is understood that the above embodiments are exemplary and are not to be construed as limiting the disclosure, and that variations, modifications, replacements and variants of the above embodiments may be made by those skilled in the art within the scope of the disclosure.

What is claimed is:

1. An anomaly detection method for time series data, comprising:
   obtaining a plurality of pieces of feature information of time series data;
   generating a target feature combination based on the plurality of pieces of feature information; and
   performing anomaly result detection based on the target feature combination,
   wherein the generating of the target feature combination based on the plurality of pieces of feature information comprises:
   generating a plurality of feature combinations based on the plurality of pieces of feature information; and
   selecting the target feature combination from the plurality of feature combinations,
   wherein the selecting of the target feature combination from the plurality of feature combinations comprises:
   calculating a correlation coefficient between features in each of the plurality of feature combinations;
   calculating a minimum variance between the features in each of the plurality of feature combinations; and
   selecting the target feature combination from the plurality of feature combinations based on the correlation coefficient and the minimum variance.

2. The method of claim 1,
   wherein the obtaining of the plurality of pieces of feature information of the time series data comprises:
   obtaining a plurality of features from a proximity deviation feature, a periodic deviation feature, a trend deviation feature and a residual feature of the time series data.

3. The method of claim 1,
   wherein the performing of the anomaly result detection based on the target feature combination comprises:
   generating an abnormal point and a normal point identified by each of a plurality of anomaly detection models by inputting the target feature combination into the plurality of anomaly detection models;
   selecting a target anomaly detection model suitable for the time series data from the plurality of anomaly detection models based on the abnormal point and the normal point output by each of the plurality of anomaly detection models; and
   performing the anomaly result detection based on the target feature combination and the target anomaly detection model.

4. The method of claim 3,
   wherein the selecting of the target anomaly detection model suitable for the time series data from the plurality of anomaly detection models based on the abnormal point and the normal point output by each of the plurality of anomaly detection models comprises:
   obtaining a distance between the abnormal point and the normal point; and
   selecting the target anomaly detection model suitable for the time series data from the plurality of anomaly detection models based on the distance between the abnormal point and the normal point.

5. The method of claim 4,
   wherein, in response to a plurality of abnormal points, the method further comprises:
   obtaining an average distance between the plurality of abnormal points and the normal point;
   wherein the selecting of the target anomaly detection model suitable for the time series data from the plurality of anomaly detection models based on the distance between the abnormal point and the normal point comprises: selecting the target anomaly detection model suitable for the time series data from the plurality of anomaly detection models based on the distance between the abnormal point and the normal point and the average distance.

6. An electronic device comprising: a memory, a processor and computer programs stored on the memory and executable on the processor, wherein when the computer programs are executed by the processor, an anomaly detection method for time series data is implemented, the method comprising:
   obtaining a plurality of pieces of feature information of time series data;
   generating a target feature combination based on the plurality of pieces of feature information; and
   performing anomaly result detection based on the target feature combination,
   wherein the generating of the target feature combination based on the plurality of pieces of feature information comprises:
   generating a plurality of feature combinations based on the plurality of pieces of feature information; and
   selecting the target feature combination from the plurality of feature combinations,
   wherein the selecting of the target feature combination from the plurality of feature combinations comprises:
   calculating a correlation coefficient between features in each of the plurality of feature combinations;
   calculating a minimum variance between the features in each of the plurality of feature combinations; and
   selecting the target feature combination from the plurality of feature combinations based on the correlation coefficient and the minimum variance.

7. The electronic device of claim 6,
   wherein the obtaining of the plurality of pieces of feature information of the time series data comprises:
   obtaining a plurality of features from a proximity deviation feature, a periodic deviation feature, a trend deviation feature and a residual feature of the time series data.

8. The electronic device of claim 6,
   wherein the performing of the anomaly result detection based on the target feature combination comprises:
   generating an abnormal point and a normal point identified by each of a plurality of anomaly detection models by inputting the target feature combination into the plurality of anomaly detection models;
   selecting a target anomaly detection model suitable for the time series data from the plurality of anomaly detection models based on the abnormal point and the normal point output by each of the plurality of anomaly detection models; and performing the anomaly result detection based on the target feature combination and the target anomaly detection model.

9. The electronic device of claim 8,
wherein the selecting of the target anomaly detection model suitable for the time series data from the plurality of anomaly detection models based on the abnormal point and the normal point output by each of the plurality of anomaly detection models comprises:
obtaining a distance between the abnormal point and the normal point; and
selecting the target anomaly detection model suitable for the time series data from the plurality of anomaly detection models based on the distance between the abnormal point and the normal point.

10. The electronic device of claim 9,
wherein, in response to a plurality of abnormal points, the method further comprises:
obtaining an average distance between the plurality of abnormal points and the normal point;
wherein, the selecting of the target anomaly detection model suitable for the time series data from the plurality of anomaly detection models based on the distance between the abnormal point and the normal point comprises: selecting the target anomaly detection model suitable for the time series data from the plurality of anomaly detection models based on the distance between the plurality of abnormal points and the normal point and the average distance.

11. A non-transitory computer-readable storage medium having computer programs stored thereon, wherein when the computer programs are executed by a processor, an anomaly detection method for time series data is implemented, the method comprising:
obtaining a plurality of pieces of feature information of time series data;
generating a target feature combination based on the plurality of pieces of feature information; and
performing anomaly result detection based on the target feature combination,
wherein the generating of the target feature combination based on the plurality of pieces of feature information comprises:
generating a plurality of feature combinations based on the plurality of pieces of feature information; and
selecting the target feature combination from the plurality of feature combinations,
wherein the selecting of the target feature combination from the plurality of feature combinations comprises:
calculating a correlation coefficient between features in each of the plurality of feature combinations;
calculating a minimum variance between the features in each of the plurality of feature combinations; and
selecting the target feature combination from the plurality of feature combinations based on the correlation coefficient and the minimum variance.

12. The non-transitory computer-readable storage medium of claim 11,
wherein the obtaining of the plurality of pieces of feature information of the time series data comprises:
obtaining a plurality of features from a proximity deviation feature, a periodic deviation feature, a trend deviation feature and a residual feature of the time series data.

13. The non-transitory computer-readable storage medium of claim 11,
wherein the generating of the target feature combination based on the plurality of pieces of feature information comprises:
generating a plurality of feature combinations based on the plurality of pieces of feature information; and
selecting the target feature combination from the plurality of feature combinations.

14. The non-transitory computer-readable storage medium of claim 13,
wherein the selecting of the target feature combination from the plurality of feature combinations comprises:
calculating a correlation coefficient between features in each of the plurality of feature combinations; and
selecting the target feature combination from the plurality of feature combinations based on the correlation coefficient.

15. The non-transitory computer-readable storage medium of claim 11,
wherein the performing of the anomaly result detection based on the target feature combination, comprises:
generating an abnormal point and a normal point identified by each of a plurality of anomaly detection models by inputting the target feature combination into the plurality of anomaly detection models;
selecting a target anomaly detection model suitable for the time series data from the plurality of anomaly detection models based on the abnormal point and the normal point output by each of the plurality of anomaly detection models; and
performing the anomaly result detection based on the target feature combination and the target anomaly detection model.

16. The non-transitory computer-readable storage medium of claim 15,
wherein the selecting of the target anomaly detection model suitable for the time series data from the plurality of anomaly detection models based on the abnormal point and the normal point output by each of the plurality of anomaly detection models, comprises:
obtaining a distance between the abnormal point and the normal point; and
selecting the target anomaly detection model suitable for the time series data from the plurality of anomaly detection models based on the distance between the abnormal point and the normal point.

17. The non-transitory computer-readable storage medium of claim 16,
wherein, in response to a plurality of abnormal points, the method further comprises:
obtaining an average distance between the plurality of abnormal points and the normal point;
wherein, the selecting of the target anomaly detection model suitable for the time series data from the plurality of anomaly detection models based on the distance between the abnormal point and the normal point comprises: selecting the target anomaly detection model suitable for the time series data from the plurality of anomaly detection models based on the distance between the plurality of abnormal points and the normal point and the average distance.

* * * * *